United States Patent [19]

Takahashi et al.

[11] Patent Number: 5,284,909
[45] Date of Patent: Feb. 8, 1994

[54] AMPHOTERIC POLYELECTROLYTE, METHOD FOR PRODUCTION THEREOF, AND ORGANIC SLUDGE DEHYDRATER

[75] Inventors: Kazutomo Takahashi, Yokohama; Koichi Yamamoto, Tokyo; Kazuo Kodama, Yokohama; Seiichi Suzuki, Yokohama; Takashi Tazaki, Yokohama; Yutaka Morimoto, Yokohama; Hideyuki Nishibayashi, Ibaraki, all of Japan

[73] Assignee: Nippon Shokubai Kagaku Kogyo Co., Ltd., Osaka, Japan

[21] Appl. No.: 959,804

[22] Filed: Oct. 13, 1992

Related U.S. Application Data

[62] Division of Ser. No. 483,830, Feb. 23, 1990, Pat. No. 5,194,515.

[30] Foreign Application Priority Data

| Feb. 23, 1989 | [JP] | Japan | 1-41647 |
| Mar. 2, 1989 | [JP] | Japan | 1-48629 |
| Aug. 23, 1989 | [JP] | Japan | 1-214941 |
| Aug. 24, 1989 | [JP] | Japan | 1-216044 |
| Oct. 3, 1989 | [JP] | Japan | 1-257087 |
| Oct. 5, 1989 | [JP] | Japan | 1-258732 |
| Jan. 9, 1990 | [JP] | Japan | 2-1036 |
| Jan. 12, 1990 | [JP] | Japan | 2-3435 |

[51] Int. Cl.$^5$ ............................................. C08F 8/30
[52] U.S. Cl. .................................. 524/801; 524/556; 524/819; 525/329.9; 525/375

[58] Field of Search ................... 524/801, 819, 556; 525/375

[56] References Cited

U.S. PATENT DOCUMENTS

3,280,218 10/1966 Endsley et al. .
3,372,149 3/1968 Fertig et al. .
3,957,740 5/1976 Blank et al. .

FOREIGN PATENT DOCUMENTS

0163108 4/1985 European Pat. Off. .
0387567 2/1990 European Pat. Off. .

*Primary Examiner*—Bernard Lipman
*Attorney, Agent, or Firm*—Burns, Doane, Swecker & Mathis

[57] ABSTRACT

An amphoteric polyelectrolite represented by the general formula:

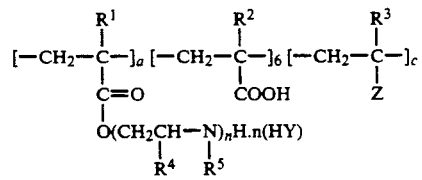

wherein $R^1$, $R^2$, $R^3$ and $R^4$ are H or alkyl, $R^5$ is H, alkyl or w-OH substituted alkyl, HY is monobasic acid, and Z is amide.

6 Claims, No Drawings

AMPHOTERIC POLYELECTROLYTE, METHOD FOR PRODUCTION THEREOF, AND ORGANIC SLUDGE DEHYDRATER

This application is a division of application Ser. No. 07/483,830, filed Feb. 23, 1990 now U.S. Pat. No. 5,194,515.

BACKGROUND OF THE INVENTION

Field of the Invention:

This invention relates to a novel amphoteric polyelectrolyte, a method for the production thereof, and an organic sludge dehydrater. The objects in which the amphoteric polyelectrolyte of this invention finds utility include antistatic agent for synthetic fibers, synthetic resin film, and shaped articles of synthetic resin; electroconductive agent for electrostatic recording papers and electrophotographic recording papers; yield improver for paper sheet filler; paper strength enhancer; sizing agent; polymeric flocculant and dehydrater for sewage and refuse disposal; dehydrater for various colored waste waters including stained waste water; sequestrating resin for heavy metals and ion-exchange resin; component for such cosmetic goods as hair spray; rust preventive; fungicide; mildewproofing agent; and antifoggant, for example.

Description of the Prior Art:

The amphoteric polyelectrolyte which have been known to the art include:

(1) Products obtained by Mannich reaction and the like (Japanese Patent Laid-Open SHO 58(1983)-4,898 and Japanese Patent Laid-Open SHO 58(1983)-104,299), (2) Products obtained by Hoffman reaction (Japanese Patent Laid-Open SHO 55(1980)-6,556), (3) Products containing a quanternary ammonium group or a tertiary amine group as a cationic group in the molecular unit thereof (Japanese Patent Laid-Open SHO 49(1974)-6,078 and Japanese Patent Laid-Open SHO 62(1987)-205, 112), and the amphoteric polyelectrolyte obtained by aminoalkylating reaction include:

(4) Products aquated by aminoalkylating an acrylic base polymer and neutralizing the residual acid thereof with an amine (Japanese Patent Publication SHO 55(1980)-35,422), and (5) Products obtained by aminoalkylating an acrylic type base polymer with 1.0 to 1.1 equivalent weights, based on 1 equivalent weight of the acid of the base polymer, of an alkylene amine and possessing the average value of n of the suspended aminoalkyl group in the range of 1 to 1.2 (U.S. Pat. No. 3,372,149), for example.

Amphoteric polyelectrolytes have been heretofore obtained by these known techniques. Those produced by employing Mannich reaction and Hoffman decomposition reaction are not stable because of gelation, for example. An amphoteric polyelectrolyte containing mainly a quaternary ammonium group as a cationic component has been proposed as a paper strength enhancer. Though the usability of this amphoteric polyelectrolite as a flocculant is mentioned in the pertinent patent specification, the polyelectrolyte is short of fulfilling the performance expected of the flocculant. Moreover, the cationic monomer used therefor is expensive. When an amphoteric polyelectrolyte is produced by the known technique resorting to aminoalkylation, it is unstable and vulnerable to gelation.

Heretofore, the disposal of various plant effluents and the disposal of sewage and excrements have given rise to sludge of polymeric flocced and sedimented particles and excess sludge. As a dehydrater for the sludge of this type, an organic flucculant has come to find utility. In the methods for flocculation and dehydration of sludge, the method which resorts to exclusive addition of a cationic organic macromolecular flocculant and the method which resorts to simultaneous addition of a cationic organic polymeric flocculant and an anionic organic polymeric flocculant have been famous.

The method which relies on the sole addition of a cationic organic polymeric flocculant, however, is not fully effective in disposing thoroughly of the sludge and bringing about a satisfactory result in terms of cake content and speed of filtration, for example.

Further, in case of the method relying on combined use of a cationic organic polymeric flocculant and an anionic organic polymeric flocculant, though it possibly allows improvement in cake content and speed of filtration, it has a disadvantage that the operation thereof necessitates installation of a plurality of flocculant dissolving tanks and flocculant reacting tanks, the equipment therefor is expensive, and the disposal of sludge calls for heavy consumption of additives and boosts the cost of chemicals.

In recent years, a method has been proposed which uses a cationic organic macromolecular flocculant and an anionic organic macromolecular flocculant as dissolved jointly in a solution with the pH of the solution controlled as disclosed in Japanese Patent Publication SHO 60(1985)-43,800 and Japanese Patent Laid-Open SHO 58(1983)-216,706. In the case of this method, however, there is imposed a restriction on the kind of the cationic organic polymeric flocculant to be effectively usable for this method. Then, in the case of an amphoteric organic polymeric flocculant using as a cationic component thereof a monomer containing a tertiary amine or a quaternary salt as disclosed in Japanese Patent Laid-Open SHO 62(1987)-205,112, a restriction is imposed on the balance of composition of the flocculant.

When an organic polymeric flocculant containing both a cationic and an anionic component is used as an organic sludge dehydrater, the dehydrated cake content is smaller than when a cationic or an anionic flocculant is used alone as disclosed in Japanese Patent Publication SHO 60(1985)-43,800, Japanese Patent Laid-Open SHO 58(1983)-216,706, and Japanese Patent Laid-Open SHO 63(1988)-205,112. The use found for this flocculant, however, is limited.

In the case of an amphoteric organic macromolecular flocculant having as a cationic component thereof a monomer containing a tertiary amine, since the balance of composition is limited, the value of equivalent weight of cation, that of anion, and the equivalent weight ratio of cation/anion have their own limits. An amphoteric organic sludge dehydrater which combines ability of flocculation and ability of dehydration remains yet to be developed.

An object of this invention, therefore, is to provide a novel amphoteric polyelectrolyte, a method for the production thereof, and an organic sludge dehydrater using the amphoteric polyelectrolyte possessing highly satisfactory stability, a method for the production thereof, and an organic sludge dehydrater.

SUMMARY OF THE INVENTION

The objects described above are accomplished by a amphoteric polyelectrolyte represented by the general formula I:

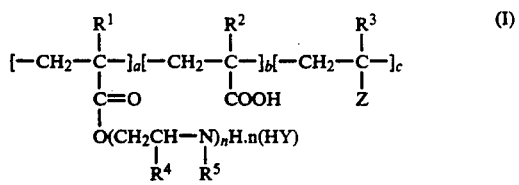

wherein n is an integer in the range of 1 to 5, providing the average value of n is not less than 2, a, b, and c are proportions such that the sum, a+b+c is 1, or a+b is 1, $R^1$, $R^2$, $R^3$ and $R^4$ are independently hydrogen atoms or an alkyl group, $R^5$ is hydrogen atom, an alkyl group, or an alkyl group substituted with a ω-hydroxy group, HY is a monobasic acid, and Z is an amide group represented by the general formula II:

$$-CONR^6R^7 \qquad (II)$$

wherein $R^6$ and $R^7$ are independently a hydrogen atom or an alkyl group, a hydroxyalkyl group represented by the general formula III:

wehrein $R^8$ and $R^9$ are independently hydrogen atom or an alkyl group, or a nitrile group represented by the general formula IV:

$$-CN \qquad (IV)$$

These objects are further accomplished by a method for the production of an amphoteric polyelectrolyte possessing an aminoalkyl group and a carboxyl group, which method comprises either polymerizing in water at least one anionic monomer (i) selected from the group consisting of acrylic acid and methacrylic acid or copolymerizing the anionic monomer (i) with a nonionic monomer (ii), causing an alkylene imine of an amount of not less than 1.2 mols per mol of the anionic monomer (i) to react on the resultant vinylic carboxylic acid polymer (iii) thereby aminoalkylating the polymer (iii), and subsequently acidifying the aminoalkylated polymer with a monobasic acid.

These objects are also accomplished by an amphoteric polyelectrolyte having aminoalkyl group and a carboxyl group and represented by the general formula V:

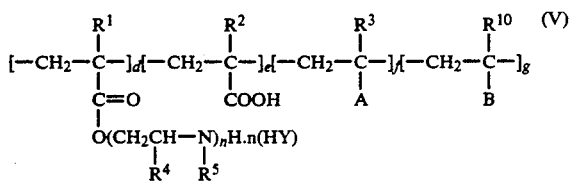

wherein n is an integer in the range of 1 to 5, d, e, f, and g are proportions such that the sum, d+e+f+g, is 1, or d+e+f is 1, $R^1$, $R^2$, $R^3$, $R^4$ and $R^{10}$ are independently hydrogen atom or an alkyl group, $R^5$ is hydrogen atom, an alkyl group, or an alkyl group substituted with a ω-hydroxy group, HY is a monobassic acid, A is an ester group represented by the general formula VI:

$$-CO_2R^{11} \qquad (VI)$$

wherein $R^{11}$ is an alkyl group, an aromatic group, or an alicyclic group, an unsubstituted or a p-substituted phenyl group represented by the general formula VII:

wherein $R^{12}$ is hydrogen atom, an alkyl group, or a hydroxy group, or a nitrile group represented by the general formula IV:

$$-CN \qquad (IV)$$

B is an amide group represented by the general formula II:

$$-CONR^6R^7 \qquad (II)$$

wherein $R^6$ and $R^7$ are independently hyrogen atom or an alkyl group, a hydroxyalkyl group represented by the general formula III:

wherein $R^8$ and $R^9$ are independently hydrogen atom or an alkyl group, or a nitrile group represented by the general formula IV:

$$-CN \qquad (IV)$$

These objects are accomplished by a method for the production of an amphoteric polyelectrolyte having an aminoalkyl group and a carboxyl group, which method comprises either emulsion polymerizing in water at least one anionic monomer (i) selected from the group consisting of acrylic acid and methacrylic acid and a nonionic monomer (iv) corresponding to A in the general formula V to be added for the purpose of emulsification or effecting in water the emulsion polymerization in the presence of a nonionic monomer (v) corresponding to B in the general formula V, causing an alkylene imine to react on the resultant vinylic carboxylic acid polymer emulsion (vi) thereby aminoalkylating the polymer emulsion, and subsequently acidifying the aminoalkylated polymer emulsion with a monobasic acid.

These objects are further accomplished by a water-in-oil type amphoteric copolymer emulsion containing an amphoteric polyelectrolyte represented by the general formula VIII:

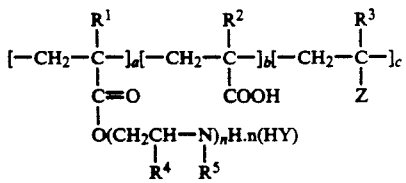

$$[-CH_2-\underset{\underset{\underset{R^4\ R^5}{|\ \ |}}{\underset{O(CH_2CH-N)_nH.n(HY)}{|}}}{\underset{C=O}{|}}]_a[-CH_2-\underset{\underset{COOH}{|}}{\underset{|}{C}}-]_b[-CH_2-\underset{Z}{\underset{|}{C}}-]_c \quad \text{(VIII)}$$

wherein n is an integer in the range of 1 to 5, providing the average value of n is not less than 2, a, b, and c are proportions such that the sum, $a+b+c$ is 1 or $a+b$ is 1, $R^1$, $R^2$, $R^3$, and $R^4$ are independently hydrogen atom or an alkyl group, $R^5$ is hydrogen atom, an alkyl group, or an alkyl group substituted with a ω-hydroxy group, HY is a monobasic acid, and Z is an amide group represented by the general formula II:

$$-COR^6R^7 \quad \text{(II)}$$

wherein $R^6$ and $R^7$ are independently hydrogen atom or an alkyl group, hydroxyalkyl group represented by the general formula III:

$$-CO_2CH-CHOH \atop \phantom{-CO_2}R^8\phantom{CH-}R^9 \quad \text{(III)}$$

wherein $R^8$ and $R^9$ are independently hydrogen atom or an alkyl group, a nitrile group represented by the general formula IV:

$$-CN \quad \text{(IV)}$$

or an ester group represented by the general formula IX:

$$-CO_2R^{10} \quad \text{(IX)}$$

wherein $R^{10}$ is an alkyl group, an aromatic group, or an alicyclic group.

These objects are also accomplished by a method for the production of a water-in-oil type amphoteric polyelectrolyte emulsion having an aminoalkyl group and a carboxyl group, which method comprises emulsifying either at least one anionic monomer (i) selected from the group consisting of acrylic acid and methacrylic acid or a mixture of the anionic monomer (i) with a nonionic monomer (ii) in water-in-oil form in the presence of water, a surfactant, and a hydrophobic organic solvent, causing an alkylene imine to react on the resultant water-in-oil form vinylic carboxylic acid emulsion (vii) resulting from the polymerization or copolymerization by the use of a radical polymerization catalyst thereby aminoalkylating the emulsion, and subsequently acidifying the aminoalkylated emulsion with a monobasic acid.

These objects are further accomplished by an organic sludge dehydrater containing an amphoteric polyelectrolyte, represented by the general formula I.

These objects are also accomplished by an organic sludge dehydrater containing an amphoteric polyelectrolyte represented by the general formula V and possessing an aminoalkyl group and a carboxyl group.

These objects are further accomplished by an organic sludge dehydrater containing a water-in-oil form amphoteric macromolecular emulsion containing a macromolecular ampholyte represented by the general formula VIII.

The amphoteric polyelectrolite of this invention finds utility for antistatic agent for synthetic fibers, synthetic resin film, and shaped articles of synthetic resin; electroconductive agent for electrostatic recording papers and electrophotographic recording papers; yield improver for paper sheet filler; paper strength enhancer; sizing agent; macromolecular flocculant and dehydrater for sewage and refuse disposal; dehydrater for various colored waste waters including stained waste water; sequestrating resin for heavy metals and ion-exchange resin; component for such cosmetic goods as hair spray; rust preventive; fungicide; mildewproofing agent; and antifoggant, for example.

The organic sludge dehydrater of this invention can be used on organic sludge by the same method as the conventional cation flocculant formed of the quaternized dimethylamino methacrylate, for example. It is so effective as to form tenacious flocs, which on being dehydrated with a press produce sludge of a conspicuously lowered water content. This effect manifests itself particularly conspicuously when the treatment of dehydration is effected with a press. During the course of gravitational filtration in a press dehydrating device, owing to the interaction between the cation group and the anion group in the polymer, the speed of filtration is conspicuously heightened, the water content of filtration residue is notably lowered, and the peelability of the filtration case from the filter cloth is improved to a great extent. The dehydrated sludge has small viscosity and low water content and, therefore, allows ease of handling and enables the fuel and cost of incineration to be lowered greatly. The species of organic sludge which are subjectable to the dehydration treatment herein include initially sedimented raw sludge occurring in sewage treatment, excess sludge occurring in activated sludge treatment and mixtures thereof with other refuses, digested sludge, and excess sludge produced in the treatment with activated sludge of various organic substance-containing waste waters, for example.

EXPLANATION OF THE PREFERRED EMBODIMENT

First, the amphoteric polyelectrolyte represented by the general formula I will be described below. The subscript, n, is an integer in the range of 1 to 5, preferably 1 to 3, providing that the average value of n precede 2 and preferably in the range of 2 to 3. The proportions of a, b, and c are such that the sum $a+b+c$ is 1 or $a+b$ is 1 and the ratio a:b:c is in the range of 0.2–0.999: 0.001–0.2:0–0.6, preferably 0.4–0.99:0.01–0.1:0–0.5 $R^1$, $R^2$, $R^3$, and $R^4$ are independingly hydrogen atom or an alkyl group. The number of carbon atoms of the alkyl group is preferably to fall in the range of 1 to 2. $R^5$ is hydrogen atom, an alkyl group, or an alkyl group substituted with a ω-hydroxy group. The number of carbon atoms of the alkyl group is preferable in the range of 1 to 2. NY is a monobasic acid.

Z is an amide group represented by the general formula II, $-CONR^6R^7$, a hydroxyalkyl group represented by the general formula III, $$-CO_2CH-CHOH \atop \phantom{-CO_2}R^8\phantom{CH-}R^9$$

, or a nitrile group represented by the general formula IV, $-CN$. $R^6$, $R^7$, $R^8$, and $R^9$ are independently hydrogen atom or an alkyl group. The number of carbon atoms of the alkyl group is preferably in the range of 1 to 2.

The amphoteric polyelectrolite represented by the general formula I is produced by either polymerizing in water at least one anionic monomer (i) selected from the group consisting of acrylic acid and methacrylic acid or copolymerizing the anionic monomer (i) with a nonionic monomer (ii), causing an alkylene imine of an amount of not less than 1.2 mols per mol of the anionic monomer (i) to react on the resultant vinylic carboxylic acid polymer (iii) thereby aminoalkylating the polymer (iii), and subsequently acidifying the aminoalkylated polymer with a monobasic acid.

The anionic monomer (i) is preferably an acrylic acid or methacrylic acid. The nonionic monomer (ii) is required to be selected in consideration of the characteristic of acid dissociation. The acid dissociation indexes of acrylic acid and methacrylic acid at 25° C. are 4.3 and 4.7 respectively. Though acrylic acid or a salt thereof in water of a pH value of not more than 4.3 or methacrylic acid or a salt thereof in water of a pH value of not more than 4.7 assumes ionic form, the proportion of its ion sharply decreases below the indicated pH value. The monomers both are in substantially undissociated form in water of a pH value of not more than 3.5. In the case of an anionic monomer possessing a sulfonic acid group of a small dissociation acid index, since the amount of ion seeds present is large even in a low pH region approximately in the range of 2 to 3, the outstanding effect of this invention cannot be attained by using this monomer.

The nonionic monomer (ii) may be any nonionic monomer copolymerizable with the monomer (i) mentioned above. For example, a vinylic monomer possessing an amide group represented by the general formula X can be used.

In the general formula X, $R^3$, $R^6$, and $R^7$ are independently hydrogen atom or an alkyl group as described above. The vinylic monomers of the general formula X include acrylamide, methacrylamide, N,N-dimethyl acrylamide, N,N-dimethyl methacrylamide, N,N-diethyl acrylamide, and N,N-diethyl methacrylamide, for example.

A vinylic monomer possessing a hydroxyalkyl group represented by the general formula XI is also usable.

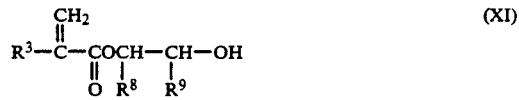

In the general formula XI, $R^3$, $R^8$, and $R^9$ are independently hydrogen atom or an alkyl group. The vinylic monomers of the general formula XI include hydroxyethyl acrylate, hydroxyethyl methacrylate, hydroxypropyl acrylate, and hydroxypropyl methacrylate, for example. Acrylonitrile and methacrylonitrile may be also cited.

It should be noted that the nonionic monomer (ii) is used herein for the purpose of adjusting the molecular weight and ion equivalent weight of the macromolecular ampholyte. Generally, it is preferable to account for a proportion in the range of 0 to 60 mol %, preferably 0 to 50 mol %, in the vinylic carboxylic acid polymer (iii).

In the production of the amphoteric polyelectrolite by the method of this invention, the amount of the anionic monomer (i) and that of the nonionic monomer (ii) to be used in the polymerization of the vinylic carboxylic acid polymer (iii) must be fixed so that the produced amphoteric polyelectrolite may acquire a cation equivalent weight value, $C_v$, in the range of 0.8 to 7.0 meq/g, an anion equivalent weight value, $A_v$, in the range of 0.1 to 4.0 meq/g, and a $C_v/A_v$ ratio in the range of 1.0 to 25.0.

Further, preparatory to the aminoalkylation, it is necessary to fix the amounts of the vinylic carboxylic acid polymer (iii) and the alkylene imine to be used for the aminoalkylation.

If the cation equivalent weight value, $C_v$, is less than 0.8 meq/g, the produced amphoteric polyelectrolite manifests its characteristics only with difficulty. If the cation equivalent weight value, $C_v$, exceeds 7.0 meq/g, the produced amphoteric polyelectrolite does not easily manifest its characteristics. If the anion equivalent weight value, $A_v$, is less than 0.1 meq/g, the produced amphoteric polyelectrolite manifests its characteristics only with difficulty. Conversely, if the anion equivalent weight value, $A_v$, exceeds 4.0 meq/g, there arises a disadvantage that the produced amphoteric polyelectrolite tends to suffer a decrease in its solubility in water.

If the $C_v/A_v$ ratio is less than 1.0 and the anion equivalent weight value is unduly large proportionately, there ensues a disadvantage that the effect of the cationic group is degraded. If the $C_v/A_v$ ratio exceeds 25 and the proportion of the anionic group is unduly small, the produced amphoteric polymer cannot be expected to manifest its action sufficiently.

Preparatory to the initiation of the polymerization in this invention, the total amount of the anionic monomer (i), the nonionic monomer (ii), and the vinylic carboxylic acid polymer (iii) (hereinafter referred to as "total amount of monomers") in the aqueous solution is preferably in the range of 10 to 80% by weight. If this concentration is less than 10% by weight, there is a disadvantage that the productivity of the polymerization is inferior. Conversely, if this concentration exceeds 80% by weight, there is a disadvantage that the polymerization produces a large amount of heat and the temperature of the polymerization system rises excessively.

During the production of the vinylic carboxylic acid polymer (iii) by the polymerization in water of at least one anionic monomer (i) selected from the group consisting of acrylic acid and methacrylic acid or the copolymerization of the anionic monomer (i) with the nonionic monomer (ii), it is permissible to use, when necessary, a radical polymerization initiator of the redox type or the azo type, for example. The redox type polymerization initiators include combinations between such oxidizing agents as ammonium persulfate, potassium persulfate, hydrogen peroxide, and cumene hydroperoxide and such reducing agents as formaldehyde sodium sulfoxylate, thioglycolic acid, L-ascorbic acid, dimethylaminopropionitrile, sodium hydrogen sulfite, β-mercapto ethanol, and divalent iron salts, for example. The azo type polymerization initiators usable herein include azobisisobutyronitrile, 2,2'-azobis(2-amidinopropane)dihydrochloride, 2,2'-azobis(2,4-dimethylvaleronitrile), and 4,4'-azobis(4-cyanopentanoic acid), for example. It is permissible to use a redox type polymerization initiator and an azo type polymerization initiator in combination. The amount of the polymerization initiator is in the range of 0.001 to 10% by weight, preferably 0.01 to 5% by weight, based on the total amount of monomers.

The polymerization may be carried out in an adiabatic system, with the initial polymerization temperature kept approximately in the range of 10° to 40° C. The sheet polymerization method may be used in properly modified form, with the polymerization temperature externally controlled at a fixed level approximately in the range of 30° to 100° C., preferably 40° to 80° C.

Through the polymerization time is variable with the concentration of monomers, the polymerization temperature, the polymerization degree aimed at, and the like, it is generally in the range of 10 minutes to 10 hours, preferably 1 to 7 hours.

The aminoalkylation reaction can be carried out by causing an alkylene imine to react on the vinylic carboxylic acid copolymer (iii). Preferably, the aminoalkylation reaction is carried out at a temperature not exceeding about 65° C., preferably falling approximately in the range of 35° to 55° C.

The aminoalkylation is effected by causing reaction of the acid group of the vinyl type carboxylic acid polymer (iii) with the alkylene imine as indicated below. The reaction with 1,2-alkylene imine, for example, is indicated by the following general formula.

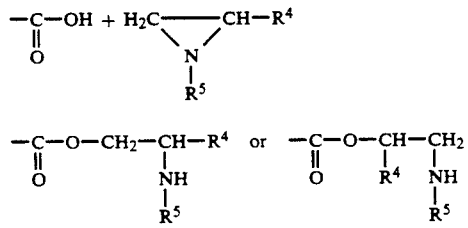

In the formula, $R^4$ is hydrogen atom or an alkyl group and $R^5$ is hydrogen atom, an alkyl group, or an alkyl group substituted with a ω-hydroxy group.

The alkylene imine for exchanging the free carboxyl group of the vinylic polymer for an aminoester group is a 1,2-alkylene imine (aziridine). Among other 1,2-alkylene imines, 1,2-propylene imine and ethylene imine prove to be particularly desirable because of their ready availability and relatively low prices. Optionally, n-alkyl-substituted or unsubstituted 1,3-alkylene imines (azetidine) are usable because their imines, in forming an aminoester group, exhibit chemical reactivity and other properties similar to those of 1,2-imines. Such compounds usable herein include 2-methyl aziridine, 2-ethyl aziridine, 2-n-propyl aziridine, 2-isopropyl aziridine, 2-n-butyl aziridine, 2-isobutyl aziridine, 2-sec-butyl aziridine, 2-(1-methylbutyl) aziridine, 2(2-methylbutyl) aziridine, 2-(3-methylbutyl) aziridine, 2-n-pentyl aziridine, 2-(methylpentyl) aziridine, 2-(methylpentyl) aziridine, 2-(4-methylpentyl) aziridine, 2(3-ethylpenty) aziridine, 2-(2-isopropylpentyl) aziridine, 2-n-hexyl aziridine, 2-n-(heptylaziridine), 2-n-octyl aziridine, 2,3-dimethyl aziridine, 2,3-di(2-methylbutyl) aziridine, 2-ethyl-3-n-hexyl aziridine, 3-n-octyl-3-propyl aziridine, 2-hydroxyethyl aziridine, and azetidines corresponding thereto such as, for example, 2-methyl azetidine, 2-ethyl azetidine, 2-n-propyl azetidine, 2,4-dimethyl azetidine, 2,4-dioctyl azetidine, and 2,3-di(2-methylbutyl) azetidine, for example.

The acidification of a suspended aminoalkyl group is effected with a monobasic acid, which is used in an amount in the range of 50 to 100 mol % (preferably 60 to 90 mol %), based on the amount of the added alkylene imine. The addition of the monobasic acid to the reaction system is carried out either collectively or peacemeal during the course of the aminoalkylation. The monobasic acid is selected from among hydrochloric acid, nitric acid, etc.

Specifically to effect the aminoalkylation, the vinylic carboxylic acid polymer (iii) and the alkylene imine added thereto in an amount of 50 mol %., based on the mol equivalent of the anionic monomer (ii) contained in the polymer (iii) are stirred for a period in the range of 5 to 60 minutes. Then, the resultant mixture and a neutral acid added thereto in an amount proportionate to the amount of the alkylene imine added are stirred continuously for a period in the range of 5 to 60 minutes. To the stirred mixture, the remaining part of the alkylene imine is gradually added over a period in the range of 5 to 60 minutes. Thereafter, the resultant mixture and the remaining part of the neutral acid added thereto are stirred for a period in the range of 5 to 60 minutes. During the course of the reaction, the reaction temperature must be kept at a level in the range of 30° to 65° C., preferably 35° to 55° C.

If the reaction temperature exceeds 65° C., the reaction mixture is gelled during the course of the reaction and the product of the reaction is opacified with suspended insoluble particles. Conversely, if the temperature is less than 30° C., the reaction itself becomes meaningless because the reaction time is elongated infinitely.

In the production of the amphoteric polyelectrolyte by the method of this invention, not only the cation equivalent weight value and the anion equivalent weight value mentioned above but also the molecular weight is preferable to be suitably controlled. The composition of the component monomers, the polymerization time, and the like are preferably set so that this molecular weight as expressed by the molecular weight of the vinylic carboxylic acid polymer (iii) may be in the range of 10,000 to 1,000,000, preferably 100,000 to 800,000.

By carrying out the polymerization in water and the reaction under the conditions mentioned above, there is obtained an aqueous solution of the amphoteric polyelectrolyte.

The amphoteric polyelectrolyte represented by the general formula VIII is in the form of water-in-oil type amphoteric copolymer emulsion. This emulsion is produced by emulsifying in water-in-oil form either the anionic monomer (i) or the mixture of the anionic monomer with the nonionic monomer (ii) in the presence of water, a surfactant, and a hydrophobic organic solvent, then polymerizing or copolymerizing the emulsified monomer or monomers through the agency of a radical polymerization catalyst thereby producing a water-in-oil form vinyl type carboxylic acid emulsion (vii), causing the alkylene imine to react on the carboxylic acid emulsion thereby aminoalkylating it, and subsequently acidifying the aminoalkylated emulsion with the monobasic acid.

The anionic monomer (i) is used as already described. The anionic monomer (i), however, is preferably used neutralized with a base such as, for example, sodium hydroxide, potassium hydroxide, or ammonia. The neutralization ratio of the anionic monomer (i) in this case is in the range of 5 to 100 mol %, preferably 20 to 95 mol %.

The compounds which are usable as the nonionic monomer (ii) include, in addition to the compounds represented by the aforementioned general formulas X and XI and acrylonitrile and mechacrylonitrile, the compounds represented by the following general formula XII.

wherein $R^3$ is hydrogen atom or an alkyl group and $R^{10}$ is an alkyl group, an aromatic group, or an alicyclic group, providing that the number of carbon atoms of the alkyl group is in the range of 1 to 6, the number of carbon atoms of the aromatic group in the range of 6 to 9, preferably 6 to 8, and the number of carbon atoms of the alicyclic group in the range of 4 to 8, preferably 5 to 7. The compounds of the general formula XII include methyl acrylate, n-propyl acrylate, iso-propyl acrylate, n-butyl acrylate, iso-butyl acrylate, 2-ethylhexyl acrylate, cyclohexyl acrylate, phenyl acrylate, methyl methacrylate, ethyl methacrylate, n-butyl methacrylate, 2-ethylhexyl methacrylate, cyclohexyl methacrylate, and phenyl methacrylate, for example.

The nonionic monomer (ii) is used herein for the purpose of adjusting the molecular weight and ion equivalent weight of the water-in-oil type amphoteric copolymer emulsion.

For the water-in-oil type amphoteric type copolymer emulsion to be produced by the method of this invention, the amounts of the anionic monomer (i) and the nonionic monomer (ii) to be used during in the polymerization of the water-in-oil form vinylic carboxylic acid polymer emulsion (iv) must be fixed so that the produced copolymer emulsion may acquire a cation equivalent weight value, Cv, in the range of 0.8 to 10.0 meq/g, and an anion equivalent weight value, Av, in the range of 0.1 to 6.0 meq/g.

When at least one anionic monomer (i) selected from the group consiting of acrylic acid and methacrylic acid or a mixture of the anionic monomer (i) with a nonionic monomer (ii) is to be emulsified in water-in-oil form in the presence of water, a surfactant, and a hydrophobic organic solvent, the surfactant may be a nonionic surfactant in popular use. The nonionic surfactants which are usable herein include sorbitan monooleate, sorbitan monostearate, sorbitan monolaurate, polyoxyethylene sorbitan monostearate, polyoxyethylene sorbitan monooleate, polyoxyethylene sorbin monolaurate, polyoxyethylene nonylphenyl ether, polyoxyethylene lauryl ether, glycerol monostearate, and glycerol monooleate, for example. These nonionic surfactants may be used either singly or in the form of a mixture of two or more members.

Optionally, the nonionic surfactant may be used in combination with an anionic and a cationic surfactant of ordinary grade.

The hydrophobic organic solvents which are usable herein include hydrophobic aliphatic and aromatic hydrocarbons, vegetable and animal oils, and modified products of such oils, for example. Typical examples are normal paraffin, isoparaffin, cyclohexane, toluene, xylene, kerosine, mineral oils, and lamp oil, etc.

The total amount of the anionic monomer (i) and the nonionic monomer (ii) to be used herein is preferable to account for a concentration in the range of 20 to 80% by weight, based on the amount of water. The concentration of the surfactant to be used is preferably in the range of 5 to 30% by weight, based on the amount of the hydrophobic organic solvent. The ratio of the hydrophobic organic solvent to the water is in the range of 1:10 to 10:1, preferably 1:5 to 3:1.

When the water-in-oil form monomer emulsion obtained by emulsifying in water-in-oil form at least one anionic monomer (i) selected from the group consisting of acrylic acid and methacrylic acid or a mixture of the anionic monomer (i) with a nonionic monomer (ii) in the presence of water, a surfactant, and a hydrophobic organic solvent is to be polymerized or copolymerized, a redox type or azo type radical polymerization initiator may be used as occasion demands. The kinds of the redox type and azo type radical polymerization initiator and the amount of addition of the radical polymerization initiator are as already described.

It is also permissible to add to the polymerization system a well-known chain transfer agent such as isopropyl alcohol, erythorubic acid, or 2-mercapto ethanol.

The polymerization temperature is preferably externally controlled, during the initial phase of the polymerization, in the range of 10° to 60° C., preferably 20° to 60° C. and, during the normal phase of the polymerization, in the range of 30° to 100° C., preferably 40° to 80° C.

Though the polymerization time is variable with the concentration of monomers, the polymerization temperature, and the polymerization degree aimed at, for example, it is generally in the range of 10 minutes to 10 hours, preferably 1 to 7 hours.

The reaction of aminoalkylation can be effected by causing an alkylene imine to react on the water-in-oil form vinylic carboxylic acid polymer emulsion (iv).

Preparatory to the aminoalkylation, it is necessary to fix the amounts of the water-in-oil form vinylic carboxylic acid polymer emulsion (iv) and the alkylene imine to be used.

If the cation equivalent weight value, Cv, is less than 0.8 meq/g, the produced amphoteric macromolecule manifests its characteristics only with difficulty. If the cation equivalent weight value, Cv, exceeds 10.0 meq/g, the produced amphoteric polyelectrolite does not easily manifest its characteristics. If the anion equivalent value, Av, is less than 0.1 meq/g, the produced amphoteric macromolecule manifests its characteristics with difficulty. If the anion equivalent weight value, Av, exceeds 6.0 meq/g, there is disadvantage that the produced amphoteric polyelectrolite tends to exhibit inferior solubility in water.

The acid group of the water-in-oil form vinylic carboxylic acid polymer emulsion (iii) is caused to react with the alkylene imine in the conventional manner indicated below for the aminoalkylation. The reaction with a 1,2-alkylene imine is performed as already described. Typical examples of the alkylene imine and the amount of the alkylene imine to be used are as already described. The reaction of aminoalkylation is performed as already described.

For the water-in-oil form amphoteric copolymer emulsion to be obtained by the method of this invention, it is preferable to control suitably the molecular weight thereof in addition to the cation equivalent weight and the anion equivalent weight value mentioned above. With intrinsic viscosity as an index to molecular weight, the composition of the component monomers, the polymerization conditions, etc. are preferably suitably set so that the produced water-in-oil form amphoteric copolymer emulsion may aquire intrinsic viscosity $[\eta]$ in the range of 0.1 to 25, preferably 1 to 15.

Now, the amphoteric polyelectrolyte represented by the general formula V will be described. The subscript n is an integer in the range of 1 to 5, preferably 2 to 3. The proportions d, e, f, and g are such that the sum, $d+e+f+g$, or $d+e+f$ is 1, is 1 and the ratio, d:e:f: g, is 0.2–0.999: 0.001–0.2: 0.01–0.2: 0–0.8, preferably 0.4–0.99: 0.01–0.1: 0.1–0.2: 0–0.07. $R^1$, $R^2$, $R^3$, and $R^{10}$ are independently hydrogen atom or an alkyl group, providing that the number of carbon atoms of the alkyl group is in the range of 1 to 2. $R^5$ is a hydrogen atom, an alkyl group, or an alkyl group substituted with a $\omega$-hydroxy group, providing that the number of carbon atoms of the alkyl group is in the range of 1 to 6, preferably 1 to 3. HY is a monobasic acid. A is an ester group represented by the general formula VI, $-CO_2R^{11}$ wherein $R^{11}$ is an alkyl group, an aromatic group, or an alicyclic group, providing that the number of carbon atoms of the alkyl group is in the range of 1 to 6, preferably 1 to 3, the number of carbon atoms of the aromatic group in the range of 6 to 9, preferably 6 to 8, and the number of carbon atoms of the alicyclic group in the range of 4 to 8, preferably 5 to 7, an unsubstituted or p-substituted phenyl group represented by the general formula VII

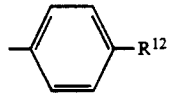

(VII)

wherein $R^{12}$ is hydrogen atom, an alkyl group, or an hydroxide hydroxyl group, providing that the number of carbon atoms of the alkyl group is in the range of 1 to 2, or a nitrile group represented by the general formula IV. B stands for an ester group represented by the general formula III or a nitrile group represented by the general formula IV.

The amphoteric polyelectrolite represented by the general formula V is produced by either emulsion polymerizing in water at least one anionic monomer (i) selected from the group consisting of acrylic acid and methacrylic acid and a nonionic monomer (iv) corresponding to A in the general formula V to be added to the anionic monomer (i) for the purpose of emulsification with the anionic monomer or effecting this emulsion polymerization in water in the presence of a nonionic monomer (v) corresponding to B in the general formula V, aminoalkylating the resultant vinylic carboxylic acid polymer emulsion (vi) by the reaction thereof with an alkylene imine, and subsequently acidifying the aminoalkylated polymer emulsion with a monobasic acid.

The anionic monomer (i) to be used herein is as already described.

The nonionic monomer (iv) may be any nonionic monomer which is emulsifiable and, at the same time, copolymerizable with the aforementioned monomer (i). The nonionic monomers which are usable herein include vinylic monomers possessing an ester group represented by the general formula XII. Typical examples are as already cited. Further, vinyl compounds possessing an unsubstituted or p-substituted phenyl represented by the general formula XIII:

(XIII)

wherein $R^3$ and $R^{12}$ have the meanings defined above, are also usable. Typical examples are styrene, p-methylstyrene, and p-vinylphenol. Acrylonitrile may be cited as another example.

The nonionic monomer (v) is used herein for the purpose of enabling the vinylic carboxylic acid polymer emulsion (vi) to be obtained as an emulsion possessing low viscosity and allowing an increase in molecular weight. Generally it is added in an amount of not more than 20 mol %, based on the amount of the vinylic carboxylic acid polymer emulsion (vi). If this amount exceeds 20 mol %, there arises a disadvantages that the produced amphoteric polyelectrolyte exhibits inferior solubility in water.

As the nonionic monomer (v), any of the nonionic monomers which are copolymerizable with the aforementioned monomers (i) and (iv) can be used. These nonionic monomers include the vinylic monomers possessing an amide group as represented by the general formula X and the vinylic monomers possessing a hydroxyalkyl group as represented by the general formula XI, for example. Typical examples of these monomers are as already cited. Besides, acrylonitrile and methacrylonitrile are also usable.

The nonionic monomer (v) is used for the purpose of adjusting the molecular weight and ion equivalent weight of the amphoteric polyelectrolite. Generally, it is preferable preferably used in an amount of not more than 70 mol % based on the amount of the vinyl type carboxylic acid polymer emulsion (vi).

For the amphoteric polyelectrolyte to be produced by the method of this invention, it is necessary to fix the amounts of the anionic monomer (i) and the nonionic monomers (iv) and (v) to be used in the polymerization of the vinylic carboxylic acid polymer emulsion (vi) so that the produced amphoteric polyelectrolite may acquire a cation equivalent weight value, Cv, in the range of 0.8 to 10.0 meq/g and an anion equivalent weight value, Av, in the range of 0.1 to 6.0 meq/g. The amounts of monomers [the total amount of the anionic monomer (i) and the nonionic monomers (iv) and (v) (hereinafter referred to as "total amount of monomers")] are preferable to account for a concentration approximately in the range of 10 to 80% by weight. If the concentration is less than 10% by weight, there arises a disadvantage that the polymerization betrays poor productivity. Conversely, if the concentration exceeds 80% by weight, a disadvantage that the polymerization generates a large volume of heat and the polymerization system suffers from undue rise of temperature.

In emulsion polymerizing in water at least one anionic monomer (i) selected from the group consisting of acrylic acid and methacrylic acid and a nonionic monomer (iv) corresponding to A in the general formula V to be added for the purpose of emulsification with the anionic monomer or in effecting the emulsion polymerization in the presence of a hydrophilic nonionic monomer (v) corresponding to B of the general formula V, it is permissible to use a surfactant for the purpose of ensuring thorough dispersion of the monomers (i), (iv), and (v). Though the surfactant to be used is not specifically defined, it is preferable to possess relatively high hydrophylicity enough for the formation of an O/W form emulsion in consequence of the emulsification. The surfactants which are usable herein for this purpose include nonionic surfactants such as polyoxyethylene nonylphenyl ether and polyoxyethylenestearyl ether, anionic surfactants such as sodium lauryl sulfate and polyoxyethylene nonylphenyl ether sodium sulfate, and cationic surfactants such as stearyl amine acetate and stearyl trimethyl ammonium chloride, for example. The amount of the surfactant to be used is in the range of 0.01 to 10% by weight, preferably 0.1 to 5% by weight, based on the total amount of monomers.

In the production of the vinylic carboxylic acid polymer emulsion (vi), it is permissible to use a redox type or azo type radical polymerization initiator, as occasion demands. The kinds of the polymerization initiator and the amount of the polymerization initiator to be used are as already described.

The polymerization temperature is required to be controlled externally, during the initial phase of the polymerization, in the range of 10° to 40° C., preferably 20° to 40° C., and, during the normal course of the polymerization, in the range of 30° to 100° C., preferably 40° to 80° C.

Though the polymerization time is variable with the concentration of the monomers, the polymerization temperature, and the polymerization degree aimed at, for example, it is generally in the range of 10 minutes to 10 hours, preferably 1 to 7 hours.

Preparatory to the reaction of aminoalkylation, it is necessary to fix the amounts of the vinylic carboxylic acid polymer emulsion (vi) and the alkylene imine.

If the cation equivalent weight value, Cv, is less than 0.8 meq/g, the produced amphoteric polyelectrolyte does not manifest its characteristics easily. Conversely, if the cation equivalent weight value, Cv, exceeds 10.0 meq/g, the characteristics expected of the produced amphoteric polyelectrolite do not easily manifest themselves. If the anion equivalent weight value, Av, is less than 0.1 meq/g, the produced amphoteric polyelectrolyte manifests its characteristics only with difficulty. If this value exceeds 6.0 meq/g, there is a disadvantage that the produced amphoteric polyelectrolyte tends to exhibit inferior solubility in water.

The aminoalkylation can be carried out by causing the vinylic carboxylic acid copolymer emulsion (vi) to be acted upon by an alkylene imine.

Specifically, the aminoalkylation is conventional manner as described above between the carboxylic acid group of the vinylic carboxylic acid polymer emulsion (vi) and the alkylene imine. The typical examples of the alkylene imine and the amount of the alkylene imine to be used are as already described. The conditions for the aminoalkylation are also as described above.

In the production of the amphoteric polyelectrolyte by the method of this invention, it is preferable to control suitably the molecular weight thereof in addition to the cation equivalent weight value and the anion equivalent weight value mentioned above. With intrinsic viscosity as an index to molecular weight, the composition of the component monomers, the polymerization conditions, etc. are preferable to be suitably set so that the produced amphoteric polyelectrolyte may acquire intrinsic viscosity [$\eta$] in the range of 0.1 to 25, preferably 1 to 15.

By carrying out the polymerization and reaction in water under the conditions described above, the amphoteric polyelectrolyte can be produced.

The organic sludge dehydrater of this invention, in addition to organic sludge, gives rise to flocs. These flocs are destined to be dehydrated by the conventional method. The dehydrating devices which are usable for this purpose include screw-press type dehydrating devices, filter-press type dehydrating devices, belt-press type dehydrating devices, screw decanters, and centrifugal devices, for example.

Now, the present invention will be described more specifically below with reference to working examples. It should be noted, however, that the present invention is not limited in any sense by these examples.

In the following Examples and Controls, the abbreviation are as follows:
AA: acrylic acid
AAm: acrylamide
HEA: 2-hydroxyethyl acrylate
AN: acrylonitrile
MAm: methacrylamide
AI: alkylene imine
EI: ethylene imine
PI: propylene imine
St: styrene
MA: methyl acrylate
BA: butyl acrylate
MMA: methyl methacrylate
MAA: methacrylic acid REFERENTIAL EXAMPLES 1 to 6

Production of vinylic carboxylic acid polymer (iii)

A varying vinylic carboxylic acid polymer (iii) was obtained by placing in a reactor a mixture comprising monomers of amounts forming an indicated weight ratio and totalling a proportion of 20% by weight, displacing the air entrapped in the reactor with nitrogen gas, and effecting polymerization of the monomer mixture by keeping the monomer mixture at 50° C. and adding thereto 0.2% by weight each, based on the total amount of monomers, of ammonium persulfate (APS) and sodium hydrogen sulfite (SB).

Example 1

In a reactor, 1,000 g of the vinylic carboxylic acid polymer synthesized in Referential Example 1 was placed, heated to 50° C., kept at this temperature throughout the whole course of reaction and, after dropwise addition of 59.7 g of ethylene imine thereto, stirred with the added ethylene imine for 30 minutes. The amount of the ethylene imine thus added dropwise to the polymer accounted for 50 mol %, based on the mol equivalent of the carboxylic acid in the charged vinylic carboxylic acid polymer. Then, the resultant reaction mixture was stirred for 30 minutes with 143 g of an aqueous 61 wt % nitric acid solution, i.e. an amount proportionate to the amount of the dropwise added ethylene imine. The ensuant mixture was stirred for 30 minutes with the balance, or 140.3 g, of ethylene imine. The resulting mixture, after dropwise addition thereto of 193 g of an aqueous 61 wt % nitric acid solution, was stirred with the aqueous solution for 30 minutes, to obtain an amphoteric polyelectrolite. The reaction conditions involved herein and the appearance of the reaction product were as shown in Table 2.

TABLE 1

| Referential Example | Composition ratio of monomers |
|---|---|
| 1 | AA/AAm = 100/0 |
| 2 | AA/AAm = 80/20 |
| 3 | AA/AAm = 60/40 |
| 4 | AA/HEA = 60/40 |
| 5 | AA/AAm/AN = 60/35/5 |
| 6 | AA/MAm = 60/40 |

Examples 2 to 9

The procedure of Example 1 was repeated, except that the conditions indicated in Table 2 were used instead. The physical properties of the reaction products were as shown in Table 2.

Controls 1 to 5

The procedure of Example 1 was repeated, except that the conditions indicated in Table 2 were used instead. The physical properties of the reaction products were as shown in Table 2.

The cation equivalent weight values, the anion equivalent weight values, and the average values of n indicated in Table 2 were determined by the following methods (which similarly apply hereinafter).

(1) Cation equivalent weight value

This property was determined by placing 95 ml of distilled water in a beaker, adding thereto 5 ml of a solution of 1,000 ppm of a given sample, adjusting the pH value of the resultant solution to 7.0 by addition of either 1% HCl or 1% NaOH, stirring the solution for about 1 minute, then adding two or three drops of toluidine blue indicator solution, and titrating the solution with N/400 PVSK (polyvinyl sulfate potassium solution) at intervals of 2 ml. The time at which an interval of at least 10 seconds elapsed after the color of the sample water had changed from blue to reddish purple was taken as the end point of this titration.

Cation equivalent weight value (Cv)
(meq/g) = (Amount of titrant [ml] for
sample − amount of titrant [ml] for blank) × F/2 ×
(concentration of effective component (ppm) in
sample)

The term "effective component" as used herein refers to the component remaining after removal of neutralizing acid from the solids of the sample.

(2) Anion equivalent weight value

This property was determined by placing 50 ml of distilled water in a beaker, adding thereto about 0.3 g of accurately weighed sample, stirring the resultant solution, and titrating this solution with a N/10 NaOH solution to obtain the scale reading of electroconductivity. The scale reading of titration corresponding to the last (the point at which neutralization of the whole acid present was completed) of several points of inflection was taken for reporting.

Anion equivalent weight value (Av) (meq/g) =
0.1 × F × (Amount of titrant [ml] for N/10
NaOH) − (number of m.mols of neutralizing acid
used in accurately weighed sample
[meq]/(concentration of amount of effective
component [ppm] in sample)

(3) Average value of n

Average value of n = Cr/Ar wherein Cr is number of m.mols of alkylene imine (meq/g) in effective component of polyelectrolyte and Ar is number of m.mols of anionic monomer (i) (meq/g) in effective component of polyelectrolyte minus anion equivalent weight value (meq/g).

TABLE 2

| | Vinylic carboxylic acid polymer (iii)weight ratio(wt %) | AI | AI wt (g) | Molar ratio of COOH in AI/(iii) | a.q. neutralization acid solution | Weight of neutralization acid(g) | Neutralization acid/ AI molar ratio | Reaction temperature (°C.) | Product | Cv (meq/g) | Av (meq/g) | Cv/Av ratio | Average of n |
|---|---|---|---|---|---|---|---|---|---|---|---|---|---|
| Example 1 | Referential Example 1 AA/AAm = 100/0 | EI | 200 | 1.67 | 61% nitric acid | 336 | 0.7 | 50 | | 4.7 | 1.5 | 3.1 | 2.2 |
| 2 | Referential Example 1 AA/AAm = 100/0 | EI | 200 | 1.67 | 36% chloric acid | 330 | 0.7 | 50 | | 4.7 | 1.0 | 4.7 | 2.0 |
| 3 | Referential Example 1 AA/AAm = 100/0 | EI | 200 | 1.67 | 36% chloric acid | 472 | 1.0 | 50 | | 4.7 | 1.5 | 3.1 | 2.2 |
| 4 | Referential Example 2 AA/AAm = 80/20 | EI | 200 | 2.09 | 61% nitric acid | 336 | 0.7 | 50 | | 4.7 | 0.5 | 9.4 | 2.3 |
| 5 | Referential Example 3 AA/AAm = 60/40 | EI | 200 | 2.78 | 61% nitric acid | 336 | 0.7 | 50 | | 4.7 | 0.3 | 15.7 | 3.1 |
| 6 | Referential Example 4 AA/HEA 60/40 | EI | 200 | 2.78 | 61% nitric acid | 336 | 0.7 | 50 | | 4.7 | 0.3 | 15.7 | 3.1 |
| 7 | Referential Example 5 AA/AAm/ AN = 60/35/5 | EI | 200 | 2.78 | 61% nitric acid | 336 | 0.7 | 50 | | 4.7 | 0.3 | 15.7 | 3.1 |

TABLE 2-continued

| | Vinylic carboxylic acid polymer (iii)weight ratio(wt %) | AI | AI wt (g) | Molar ratio of COOH in AI/(iii) | a.q. neutralization acid solution | Weight of neutralization acid(g) | Neutralization acid/AI molar ratio | Reaction temperature (°C.) | Product | Cv (meq/g) | Av (meq/g) | Cv/Av ratio | Average of n |
|---|---|---|---|---|---|---|---|---|---|---|---|---|---|
| 8 | Referential Example 6 AA/AAm = 60/40 | EI | 200 | 2.78 | 61% nitric acid | 336 | 0.7 | 50 | | 4.7 | 0.3 | 15.7 | 3.1 |
| 9 | Referential Example 3 AA/AAm = 60/40 | PI | 265 | 2.78 | 61% nitric acid | 336 | 0.7 | 50 | | 4.0 | 0.26 | 15.5 | 3.0 |
| Control 1 | Referential Example 1 AA/AAm = 100/0 | EI | 200 | 1.67 | 36% chloric acid | 472 | 1.0 | 70 | Gellation | | | | |
| 2 | Referential Example 1 AA/AAm = 100/0 | EI | 200 | 1.67 | 36% chloric acid | 330 | 0.7 | 70 | Gellation | | | | |
| 3 | Referential Example 1 AA/AAm = 100/0 | EI | 200 | 1.67 | 61% nitric acid | 336 | 0.7 | 70 | Gellation | | | | |
| 4 | Referential Example 1 AA/AAm = 100/0 | EI | 132 | 1.10 | 36% chloric acid | 307 | 1.0 | 70 | | 3.7 | 0.4 | 8.8 | 1.2 |
| 5 | Referential Example 2 AA/AAm = 80/20 | EI | 200 | 2.09 | 61% nitric acid | 336 | 0.7 | 70 | Gellation | | | | |

Molar ratio of COOH in AI/(III):COOH in alkylene imne/vinylic carboxylic acid polymer(III)(molar ratio)

REFERENTIAL EXAMPLE 7

Method for production of water-in-oil form vinylic carboxylic acid polymer emulsion (vii)

In a four-neck flask fitted with a stirrer, a thermometer, a condenser, a dropping funnel, and a nitrogen gas inlet tube, 100 g of Isoper M (isoparaffin solvent produced by Exxon Chemical) was placed and 11.6 g of sorbitan monooleate was dissolved therein and the resultant mixture was emulsified by gradual addition thereto of a mixed solution prepared as an aqueous monomer solution by the combination of 80 g of acrylic acid, 20 g of acrylamide, 52.9 g of aqueous 28 wt. % ammonia solution, and 33.9 g of deionized water. After the internal gas of the reaction system had been thoroughly displaced with nitrogen gas, the reaction mixture was heated to 60° C. and, in the presence of 0.7 g of azobis(dimethyl valeronitrile) added thereto as a catalyst, was heated at 60° C. and, at the same time, stirred for 4 hours. Consequently, there was obtained a water-in-oil form vinylic carboxylic acid polymer emulsion.

Referential Examples 8 to 11

Water-in-oil form vinyl type carboxylic acid polymer emulsions were obtained by following the procedure of Referential Example 1, except that varying hydrophobic organic solvent, surfactants, and monomer compositions indicated in Table 3 were used instead.

Referential Examples 12 and 13

Aqueous solution form vinylic carboxylic acid polymers were obtained by polymerizing in water monomers of amounts forming weight ratios indicated in Table 3 and totalling a proportion of 33% by weight.

TABLE 3

| Referential Example | Weight ratio of monomers | Hydrophobic organic solvent | Surfactant |
|---|---|---|---|
| 8 | AA/AAm = 100/0 | isoparaffin | sorbitan monostearate |
| 9 | AA/AAm = 60/40 | n-paraffin | sorbitan monolaurate |
| 10 | AA/HEA = 60/40 | kerosen | glycerol monostearate |
| 11 | AA/MAm = 60/40 | toluene | sorbitan monostearate + polyoxyethelene nonyl phenyl ether |
| 12 | AA/AAm = 80/20 | — | — |
| 13 | AA/AAm = 100/0 | — | — |

Example 10

In a reactor, 200 g of the water-in-oil form vinylic carboxylic acid polymer emulsion synthesized in Referential Example 7 was placed, heated to 50° C. and kept at this temperature throughout the course of reaction and, after dropwise addition thereto of 16.0 g of ethylene imine, stirred with the added ethylene imine for 30 minutes. Then, the resultant mixture and 38.4 g of an aqueous 61 wt. % nitric acid solution added thereto were stirred for 30 minutes. Subsequently, the resulting reaction mixture and 50.8 g of ethylene imine added dropwise thereto were stirred for 30 minutes. Then, the ensuing stirred mixture and 73.9 g of an aqueous 61 wt. % nitric acid solution added thereto were stirred for 30 minutes. Consequently, there was obtained a water-in-oil form amphoteric copolymer emulsion. The reaction conditions and the physical properties of the reaction product were as shown in Table 4.

Examples 11 to 17

The procedure of Example 10 was repeated, except that the conditions shown in Table 4 were used instead. The physical properties of the reaction product were as shown in Table 4.

Controls 6 and 7

Reactions were carried out by following the procedure of Example 10, except that the aqueous solution to form vinylic carboxylic acid polymers obtained in Referential Examples 12 and 13 were respectively used instead. The physical properties of the reaction products were as shown in Table 4.

The intrinsic viscosity was determined by the following method (which applies similarly hereinafter).

(3) Intrinsic viscosity (dl/g)

In 100 parts by volume of water, 0.2 part by weight of a sample polymer was dissolved and adjusted to pH 4 with hydrochloric acid. In a conical flask fitted with a ground stopper, 50 ml of the resutlant solution was placed and gently stirred with 50 ml of 2N-NaNO$_3$ for thorough solution. Then, the resultant solution was diluted with 1N-NaNO$_3$ to concentrations of 0.02%, 0.04%, 0.06%, and 0.08%, diluted solutions were adjusted to pH 4.

In a constant temperature bath adjusted to 30° C.±0.1° C. and fitted with a Canon Fenskes viscosimeter, 10 ml of a sample was placed in the viscosimeter and allowed to flow down spontaneously. The time required for the sample to pass through the distance between the vertically separated marks on the measuring bulb was measured. This procedure was repeated at least three times to determine the intrinsic viscosity as the average. A blank test was performed with an aqueous solution of 1N-NaNO$_3$.

This procedure was performed on each of the 0.02 to 0.08% solutions mentioned above.

The reduced viscosity was calculated as follows.

Relative viscosity $\eta_{rel} = t/t_o$
Specific viscosity $\eta_{sp} = (t - t_o)/t_o = \eta_{rel} - 1$
Reduced viscosity $\eta_{sp}/c$
wherein $t_o$ is the time for downward flow of 1N-NaNO$_3$, t is the time for downward flow of sample solution, $\eta_{rel}$ is the relative viscosity, $\eta_{sp}$ is the specific viscosity, and c is the concentration of sample solution.

On a graph having the horizontal axis graduated for sample concentration and the vertical axis for reduced viscosity, the numerical values obtained by the measurement described above were plotted and straight lines were drawn across the points. The reading of the vertical axis against which the sample concentration was 0 was taken as the intrinsic viscosity of the sample.
$t_o$ = the time required for 1N-NaNO$_3$
t = the time required the sample soln.
c = the concentration of the sample soln.

TABLE 4

|  | Vinylic carboxylic acid polymer(vii)ratio (wt %) | AI | Molar ratio of COOH AI/(vii) | aq. neutralization acid solution | Neutralization acid/AI molar ratio | Cv(meq/g) | Av (meq/g) | Viscosity (25° C., CPS) | Intrinsic viscosity [η](dl/g) |
|---|---|---|---|---|---|---|---|---|---|
| Example 10 | Referential Example 7 AA/AAm = 80/20 | EI | 2.09 | 61% nitric acid | 0.7 | 4.9 | 0.5 | 510 | 5.3 |
| 11 | Referential Example 7 AA/AAm = 80/20 | EI | 3.14 | 36% chloric acid | 0.7 | 6.3 | 0.3 | 630 | 5.5 |
| 12 | Referential Example 7 AA/AAm = 80/20 | EI | 2.09 | 36% chloric acid | 1.0 | 4.9 | 0.6 | 360 | 5.2 |
| 13 | Referential Example 8 AA/AAm = 100/0 | EI | 1.67 | 61% nitric acid | 0.7 | 4.9 | 1.2 | 480 | 4.8 |
| 14 | Referential Example 9 AA/AAm = 60/40 | EI | 1.86 | 61% nitric acid | 0.7 | 3.6 | 0.8 | 440 | 5.8 |
| 15 | Referential Example 10 AA/HEA = 60/40 | EI | 2.78 | 61% nitric acid | 0.7 | 4.9 | 0.5 | 560 | 5.3 |
| 16 | Referential Example 11 AA/MAm = 60/40 | EI | 2.78 | 61% nitric acid | 0.7 | 4.9 | 0.5 | 720 | 5.2 |
| 17 | Referential Example 9 AA/AAm = 60/40 | PI | 1.59 | 61% nitric acid | 0.7 | 4.2 | 0.8 | 910 | 5.7 |
| Control 6 | Referential Example 12 AA/AAm = 80/20 | EI | 2.09 | 36% chloric acid | 1.0 | 4.7 | 0.6 | 12000 | 1.1 |
| 7 | Referential Example 13 AA/AAm = 100/0 | EI | 1.67 | 61% nitric acid | 0.7 | 4.7 | 0.4 | 10800 | 1.0 |

Intrinsic viscosity is a value in 1N—NaNO$_3$(at 30° C.).

Referential Example 14

Production of vinylic carboxylic acid polymer emulsion (vi)

In a four-neck flask fitted with a stirrer, a thermometer, a condenser, a dropping funnel, and a nitrogen gas inlet tube, 820 g of deionized water and 0.8 g of sodium lauryl sulfate were stirred for thorough solution. To the resultant solution, 25.6 g of acrylic acid (AA), 3.2 g of acrylamide (AAm), and 3.2 g of styrene (St) were added. The reaction mixture was kept stirred and the internal gas of the reaction system was thoroughly displaced with nitrogen gas. After the nitrogen displacement, the reaction mixture was heated to 50° C. and 0.288 g of ammonium persulfate (APS) and 0.288 g of sodium hydrogen sulfite were added as catalyst thereto. Immediately, 102.4 g of acrylic acid (AA), 12.8 g of acrylamide (AAm), and 12.8 g of styrene (St) were added dropwise through the dropping funnel to the reaction mixture over a period of 2 hours, with the temperature kept at 50° C. The resultant mixture was left aging for 2 hours. Consequently, there was obtained a vinylic carboxylic acid polymer emulsion. The viscosity of this polymer emulsion was 2850 cps. When this polymer emulsion was neutralized with sodium hydroxide to effect thorough solution of the emulsion and the solids content of the resultant solution was adjusted to 1% by weight, the viscosity of the solution was 130 cps.

Referential Examples 15-19

Vinylic carboxylic acid polymer emulsions (vi) were obtained by following the procedure of Referential Example 14, except that the composition of monomers was varied as indicated in Table 5.

TABLE 5

| Referential Example | Weight ratio of monomers | Viscosity (25° C., CPS) | Viscosity of 1% by weight (at solid) (25° C., CPS) |
| --- | --- | --- | --- |
| 15 | AA/AAm/St = 80/15/5 | 3,500 | 140 |
| 16 | AA/AAm/BA = 80/10/10 | 3,100 | 120 |
| 17 | AA/HEA/MMA = 60/30/10 | 3,600 | 113 |
| 18 | AA/MAA/St = 65/30/5 | 5,200 | 83 |
| 19 | AA/HAm/MA = 80/10/10 | 2,800 | 105 |
| 20 | AA/AAm = 100/0 | 35,000 | 75 |
| 21 | AA/AAm = 80/20 | 28,000 | 80 |

Example 18

In a reactor, 500 g of the vinylic carboxylic acid polymer emulsion (vi) synthesized in Referential Example 14 was placed and heated 50° C. and kept at this temperature throughout the entire course of reaction and, after dropwise addition of 19.1 g of ethylene imine thereto, was stirred with the added ethylene imine for 30 minutes. The resultant mixture and 45.9 g of an aqueous 61 wt % nitric acid solution added thereto were stirred for 30 minutes. Subsequently, the ensuant mixture and 88.6 g of an aqueous 61 wt % nitric acid solution added thereto were stirred for 30 minutes. Consequently, there was obtained an amphoteric polyelectrolyte. The reaction conditions and the physical properties of the reaction product were as shown in Table 6.

Examples 19 to 26

The procedure of Example 18 was repeated, except that the conditions indicated in Table 6 were used instead. The physical properties of the reaction products were as shown in Table 6.

Controls 8 and 9

The procedure of Example 18 was repeated, except that the vinylic carboxylic acid polymers (vi) synthesized in Referential Examples 20 and 21 were respectively used instead. The physical properties of the reaction products were as shown in Table 6.

TABLE 6

| | Vinylic carboxylic acid polymer emulsion(vi)weight ratio (wt %) | AI | Molar ratio of COOH in AI/(vi) | a.q neutralization acid solution | Neutralization acid/AI molar ratio | Properties of polyelectrolite | | |
| --- | --- | --- | --- | --- | --- | --- | --- | --- |
| | | | | | | Cv(meq/g) | Av(meq/g) | Intrinsic viscosity [η] (dl/g) |
| Example 18 | Referential Example 14 AA/AAm/St = 80/10/10 | EI | 2.09 | 61% Nitric acid | 0.7 | 5.1 | 1.3 | 3.8 |
| 19 | Referential Example 14 AA/AAm/St = 80/10/10 | EI | 3.14 | 36% Chloric acid | 0.7 | 6.9 | 0.5 | 3.8 |
| 20 | Referential Example 14 AA/AAm/St = 80/10/10 | EI | 2.09 | 36% Chloric acid | 1.0 | 5.1 | 1.0 | 3.8 |
| 21 | Referential Example 15 AA/AAm/St = 80/15/5 | EI | 1.86 | 61% Nitric acid | 0.7 | 3.7 | 0.8 | 4.0 |
| 22 | Referential Example 16 AA/AAm/BA = 80/10/10 | EI | 2.09 | 61% Nitric acid | 0.7 | 5.1 | 0.3 | 3.7 |
| 23 | Referential Example 17 AA/HEA/MMA = 60/30/10 | EI | 2.78 | 61% Nitric acid | 0.7 | 5.1 | 1.0 | 3.5 |
| 24 | Referential Example 18 AA/MAA/St = 65/30/5 | EI | 1.85 | 61% Nitric acid | 0.7 | 5.1 | 0.3 | 3.0 |
| 25 | Referential Example 19 AA/MAm/MA = 80/10/10 | EI | 2.09 | 61% Nitric acid | 0.7 | 5.1 | 0.5 | 3.3 |
| 26 | Referential Example 15 AA/AAm/St = 80/15/5 | PI | 1.59 | 61% Nitric acid | 0.7 | 5.1 | 1.4 | 4.0 |
| Control 8 | Referential Example 20 | EI | 1.67 | 36% Chloric acid | 1.0 | 4.7 | 1.5 | 1.1 |
| 9 | Referential Example 21 | EI | 2.09 | 61% Nitric acid | 0.7 | 4.7 | 1.0 | 1.0 |

Intrinsic viscosity is a value in 1N—NaNO$_3$(at 30° C.)

Examples 27 to 35

The amphoteric polymer dehydraters obtained in Examples 1 to 9 were tested for flocculation property on a mixed raw sludge (having a solids content of 2.2% by weight) from a sewage disposal plant. The results were as shown in Table 7.

Controls 10 to 12

DAM (N,N-dimethylaminoethyl methacrylate) type polymer dehydraters indicated in Table 7 were tested for flocculation property on a mixed raw sludge (having a solids content of 2.2% by weight) from a sewage disposal plant. The results were as shown in Table 7.

Control 13

The amphoteric polymer dehydrater obtained in Example 10 was tested for flocculation property on a mixed raw sludge (having a solids content of 2.2% by weight) from a sewage disposal plant. The results were as shown in Table 7.

Control 14

The amphoteric DAM (N,N-dimethylaminoethyl methacrylate) type polymer dehydrater indicated in Table 7 was tested for flocculation property on a mixed raw sludge (having a solids content of 2.2% by weight) from a sewage disposal plant. The results were as shown in Table 7.

Flocculation test

In a beaker having an inner volume of 300 ml, 150 ml of sludge was placed and a stated amount of an aqueous 0.2 wt % solution of a polymer dehydrater indicated in Table 7 was added thereto. After the addition, the sludge and the dehydrater were stirred at 150 rpm for 2 minutes with a jar tester. The flocs of sludge consequently obtained were passed through a 100-mesh nylon filter cloth under 400 mmHg in a vacuum filtrating device (leaf tester) to determine the average specific resistance of filter cake as an index to water-filtrating property. The cake resulting from the vacuum filtration was nipped between two filter cloths having a surface area of the square of 10 cm, pressed under 0.5 kg/cm$^2$ for 10 minutes, and then tested for water content.

The amount of the amphoteric polymer dehydrate added to the sludge was 15% by weight as effective component, based on the amount of the solids of the sludge slurry.

$$\alpha = 2 \cdot p \cdot q_c \cdot A^2 \cdot k / K\mu$$

$$k_m = C \cdot \alpha / A \cdot k$$

V: amount of filtrate (m$^3$)
$\theta$: time of filtration (s)
K: Routh's filtration constant (m$^3$/s)
C: Routh's filtration constant (m$^3$)
p: pressure difference (kgw/m$^3$)
A: filtration area (m$^2$)
$\mu$: viscosity of filtrate (kg/m·s) (assured to be 0.001 kg/m·s)
$\alpha$: specific resistance of cake (m/kg)
$k_m$: resistance coefficient of filter material (1/m)
k: amount of filtrate per unit mass of dried cake (m$^3$/kg) = 0.001 − m·s/p·s
m: mass ratio of wet cake dry cake
s: sludge concentration (mass ratio of solids to sludge)
p: density of filtrate (kg/m$^3$) (= 1000 kg/m$^3$)
$q_c$: coefficient for conversion of gravity (kg·m/kgw·s$^2$)

TABLE 7

| Example | Polymer dehydration agent | Properties of high molecular amphoteric dehydration agent | | | | | Cohesiveness | |
|---|---|---|---|---|---|---|---|---|
| | | Viscosity of a.q. solution (CPS) | Cv(meq/g) | Av(meq/g) | Cv/Av ratio | Average of n | Cake specific resistance (m/kg) | Water content (wt %) |
| 27 | Example 1 | 9 | 4.7 | 1.5 | 3.1 | 2.2 | 2 × 10$^{10}$ | 74.4 |
| 28 | Example 2 | 8 | 4.7 | 1.0 | 4.7 | 2.0 | 3 × 10$^{10}$ | 75.0 |
| 29 | Example 3 | 5 | 4.7 | 1.5 | 3.1 | 2.2 | 2 × 10$^{10}$ | 74.7 |
| 30 | Example 4 | 11 | 4.7 | 0.5 | 9.4 | 2.3 | 1 × 10$^{10}$ | 74.5 |
| 31 | Example 5 | 15 | 4.7 | 0.3 | 15.7 | 3.1 | 9 × 10$^{10}$ | 75.3 |
| 32 | Example 6 | 20 | 4.7 | 0.3 | 15.7 | 3.1 | 2 × 10$^{10}$ | 75.5 |
| 33 | Example 7 | 36 | 4.7 | 0.3 | 15.7 | 3.1 | 1 × 10$^{10}$ | 75.5 |
| 34 | Example 8 | 58 | 4.7 | 0.3 | 15.7 | 3.1 | 9 × 10$^{10}$ | 75.1 |
| 35 | Example 9 | 103 | 4.0 | 0.26 | 15.5 | 3.0 | 1 × 10$^{10}$ | 75.5 |
| Control 10 | DAM type | 480 | 4.7 | — | — | — | 6 × 10$^{10}$ | 77.2 |
| 11 | DAM type | 610 | 4.7 | — | — | — | 3 × 10$^{10}$ | 78.5 |
| 12 | DAM type | 570 | 2.1 | — | — | — | 5 × 10$^{10}$ | 80.6 |
| 13 | Control 4 | 16 | 3.7 | 0.4 | 8.8 | 1.2 | 5 × 10$^{10}$ | 77.8 |
| 14 | Amphoteric DAM type | 7400 | 3.2 | 0.6 | 5.3 | — | 1 × 10$^{10}$ | 78.0 |

Control 10: DAM(N,N-dimethylaminoethyl methacrylic)(Strong cation, low molecular weight Mw = 2,500,000)
Control 11: DAM(N,N-dimethylaminoethyl methacrylic)(Strong cation, low molecular weight Mw = 3,500,000)
Control 12: DAM(N,N-dimethylaminoethyl methacrylic)(Strong cation low molecular weight Mw = 61,000,000)
Control 14: Amphoteric DAM type(DAM/AAm/AA = 70/25/5, Mw = 2,500,000)
Viscosity of aqueous solution: measured 5% by weight of aqueous solution at 25° C.

The water content of the dehydrated cake was calculated from the weight of the cake after the dehydration with the press and the weight of the sludge solids remaining after 2 hours' drying at 110° C.

The average specific resistance, $\alpha$, of the cake indicates that the desirability of water filtering property increases in proportion as the average specific resistance decreases.

The average specific resistance, $\alpha$, of the cake was found by plotting the found functions of $\theta/V$ and V on a graph and calculating Routh's filtration constant K and filtration constant.

The average specific resistance, $\alpha$, of the cake and the resistance coefficient of the filter material were calculated by plotting the functions of $\theta/V$ and V on a graph paper and calculating Routh's filtration constant K and filtration constant C.

The Routh's theoretical formulas convering the constant pressure filtration are as follows:

$$V^2 + 2VC = K\theta$$

$$K = 2 \cdot p \cdot q_c \cdot A^2 \cdot k / \alpha\mu$$

$$C = A \cdot k_m \cdot k / \alpha$$

Examples 36 to 45

Method for production of organic sludge dehydrater

Organic sludge dehydraters were obtained by following the procedure of Referential Examples 7 to 11 and Examples 10 to 17. The reaction conditions were as shown in Table 8.

TABLE 8

| Example | Organic sludge dehydration agent |
|---|---|
| 36 | EI/AAm/AA = 50/10/40 |
| 37 | EI/AAm/AA = 50/15/35 |
| 38 | EI/AA = 50/50 |
| 39 | EI/AAm/AA = 50/20/30 |
| 40 | EI/HEA/AA = 50/10/40 |
| 41 | EI/MAm/AN/AA = 50/15/5/30 |
| 42 | EI/AAm/AA = 30/28/42 |
| 43 | EI/AAm/AA = 28/43/29 |
| 44 | EI/AAm/AA = 24/46/30 |
| 45 | DI/AAm/AA = 15/64/21 |

Examples 46 to 51

Flocs were formed by stirring 150 ml of mixed raw sludge from a sewage disposal plant (pH 6.1, SS 1.8 wt %, VSS/SS 76.3%) and an organic sludge dehydrater added thereto in an amount stated in Table 8 at 300 rpm for 30 seconds. Into a Buchner funnel draped with a 100-mesh nylon filter cloth, 100 ml of the flocs of sludge was poured. The amount of water passed through the filter cloth over a period of 10 seconds was measured. The sludge which passed through the filter cloth over a period of 5 minutes was nipped between two filter cloths and squeezed under 0.5 kg/cm2 for expulsion of water. The sludge (cake) resulting from the dehydration was tested for water content. The results and the physical properties are shown in Table 9.

Controls 15 to 17

The DAM (N,N-dimethylaminoethyl methacrylate) type polymers indicated in Table 9 were polymerized by the known method and then subjected to the same flocculation test as in Example 46. The results and the physical properties are shown in Table 9.

lation test as in Example 52. The results and the physical properties are shown in Table 10.

Examples 54 and 55

The organic sludge dehydraters indicated in Table 8 were subjected to the same flocculation test as in Example 46, using mixed raw sludge (pH 6.2, SS 1.4 wt %, VSS/SS 74.6%) from a sewage disposal plant. The results and the physical properties are shown in Table 11.

Controls 20 and 21

The DAM (N,N-dimethylaminoethyl methacrylate) type polymers indicated in Table 11 were polymerized by the known method and subjected to the same flocculation test as in Example 46. The results and the physical properties are shown in Table 11.

TABLE 9

| | Organic sludge dehydration agent | Properties of organic sludge dehydration of agent | | | Cohesiveness | |
|---|---|---|---|---|---|---|
| | | Cv(meq/g) | Av(meq/g) | Intrinsic viscosity [η](dl/g) | Amount of filtrated water after 10 sec(ml) | Water content of dehydrated cake(%) |
| Example 46 | Example 36 | 4.9 | 0.7 | 4.8 | 72 | 74.5 |
| Example 47 | Example 37 | 4.9 | 0.5 | 4.8 | 70 | 74.8 |
| Example 48 | Example 38 | 4.9 | 1.2 | 4.5 | 68 | 74.7 |
| Example 49 | Example 39 | 4.9 | 1.0 | 4.9 | 73 | 75.2 |
| Example 50 | Example 40 | 4.9 | 0.8 | 4.6 | 67 | 75.0 |
| Example 51 | Example 41 | 4.6 | 1.8 | 4.3 | 65 | 75.0 |
| Control 15 | DAM type | 4.7 | 0.0 | 3.5 | 50 | 77.5 |
| Control 16 | DAM type | 4.7 | 0.0 | 5.0 | 58 | 78.2 |
| Control 17 | Amphoteric DAM | 3.2 | 0.6 | 6.0 | 63 | 78.8 |

DAM type: N,N-dimethylaminoethyl methacrylate type
Amphoteric DAM: DAM/AAm/AA = 70/25/5 (wt %)
Intrinsic viscosity is a value in 1N—NaNO$_3$(at 30° C.).

TABLE 10

| | Organic sludge dehydration agent | Properties of organic sludge dehydration of agent | | | Cohesiveness | |
|---|---|---|---|---|---|---|
| | | Cv(meq/g) | Av(meq/g) | Intrinsic viscosity [η](dl/g) | Amount of filtrated water after 10 sec(ml) | Water content of dehydrated cake(%) |
| Example 52 | Example 42 | 2.9 | 1.1 | 4.9 | 75 | 78.8 |
| Example 53 | Example 43 | 2.6 | 0.5 | 5.2 | 78 | 79.0 |
| Control 18 | DAM type | 2.1 | 0.0 | 5.2 | 72 | 82.0 |
| Control 19 | DAM type | 1.9 | 0.0 | 6.5 | 75 | 82.5 |

DAM type: N,N-dimethylaminoethyl methacrylate type
Intrinsic viscosity is a value in 1N—NaNO$_3$(at 30° C.).

TABLE 11

| | Organic sludge dehydration agent | Properties of organic sludge dehydration of agent | | | Cohesiveness | |
|---|---|---|---|---|---|---|
| | | Cv(meq/g) | Av(meq/g) | Intrinsic viscosity [η](dl/g) | Amount of filtrated water after 10 sec(ml) | Water content of dehydrated cake(%) |
| Example 54 | Example 44 | 2.2 | 0.9 | 5.2 | 79 | 81.8 |
| Example 55 | Example 45 | 1.8 | 0.7 | 5.5 | 83 | 82.4 |
| Control 20 | DAM type | 1.2 | 0.0 | 6.7 | 78 | 84.7 |
| Control 21 | DAM type | 0.9 | 0.0 | 7.5 | 80 | 85.1 |

DAM type: N,N-dimethylaminoethyl methacrylate type
Intrinsic viscosity is a value in 1N—NANO$_3$(at 30° C.).

Examples 52 and 53

The organic sludge dehydraters indicated in Table 8 were subjected to the same flocculation test as in Example 46, using mixed raw sludge (pH 6.4, SS 1.7 wt %, VSS/SS 73.6%) from a sewage disposal plant. The results and the physical properties are shown in Table 10.

Controls 18 and 19

The DAM (N,N-dimethylaminoethyl methacrylate) type polymers indicated in Table 10 were polymerized by the known method and subjected to the same floccu- Examples 56 to 65

Method for production of organic sludge dehydrater

Organic sludge dehydraters were obtained by the procedure of Referential Examples 14 to 19 and Examples 18 to 26. The reaction conditions were as shown in Table 12.

TABLE 12

| Example | Organic sludge dehydration agent |
|---|---|
| 56 | EI/AAm/St/AA = 50/5/5/40 |
| 57 | EI/AAm/St/AA = 50/10/5/35 |
| 58 | EI/AAm/BA/AA = 50/5/5/40 |
| 59 | EI/HEA/MMA/AA = 50/15/5/30 |

TABLE 13

| | Organic sludge dehydration agent | Properties of organic sludge dehydration of agent | | | Cohesiveness | |
|---|---|---|---|---|---|---|
| | | Cv(meq/g) | Av(meq/g) | Intrinsic viscosity [η](dl/g) | Amount of filtrated water after 10 sec(ml) | Water content of dehydrated cake(%) |
| Example 66 | Example 56 | 5.1 | 1.3 | 3.8 | 68 | 73.8 |
| Example 67 | Example 57 | 5.1 | 0.5 | 3.8 | 66 | 74.0 |
| Example 68 | Example 58 | 5.1 | 0.3 | 4.0 | 70 | 73.7 |
| Example 69 | Example 59 | 5.1 | 0.7 | 3.5 | 65 | 74.0 |
| Example 70 | Example 60 | 5.1 | 0.5 | 3.3 | 63 | 73.7 |
| Example 71 | Example 61 | 4.8 | 1.4 | 4.0 | 70 | 74.2 |
| Control 22 | DAM type | 4.7 | 0.0 | 3.5 | 55 | 76.6 |
| Control 23 | DAM type | 4.7 | 0.0 | 5.0 | 65 | 77.2 |
| Control 24 | Amphoteric DAM type | 3.2 | 0.6 | 6.0 | 73 | 78.0 |

DAM type: N,N-dimethylaminoethyl methacrylate type
Amphoteric DAM: DAM/AAm/AA = 70/25/5 (wt %)
Intrinsic viscosity is a value in 1N—NANO$_3$(at 30° C.).

| Example | Organic sludge dehydration agent |
|---|---|
| 60 | EI/MAm/MA/AA = 50/7.5/2.5/40 |
| 61 | EI/AAm/St.AA = 50/7.5/2.5/40 |
| 62 | EI/HEA/MMA/AA = 30/21/7/42 |
| 63 | EI/AAm/MA/AA = 28/36/7/29 |
| 64 | EI/AAm/MA/AA = 24/38/8/30 |
| 65 | EI/AAm/AN/AA = 15/51/13/21 |

Examples 66 to 71

Flocs were formed by stirring 150 ml of mixed raw sludge (pH 6.7, SS 1.9 wt %, VSS/SS 73.9%) from a sewage disposal plant and an organic sludge dehydrater added thereto in an amount stated in Table 12 at 300 rpm for 30 seconds. Into a Buchner fullen draped with a 100-mesh nylon filter cloth, 100 ml of the flocs was poured. The amount of water passed through the filter cloth over a period of 10 seconds was measured. Then, the sludge which had passed through the filter cloth over a period of 5 minutes was interposed between filter cloths and squeezed under pressure of 0.5 kg/cm$^2$ for 2 minutes to expel the water. The sludge (cake) resulting from the dehydration was tested for water content. The results and the physical properties are shown in Table 14.

Controls 22 to 24

The DAM (N,N-dimethylaminoethyl methacrylate) type polymers indicated in Table 13 were polymerized by the known method and subjected to the same flocculation test as in Example 66. The results and the physical properties are shown in Table 13.

Examples 72 and 73

The organic sludge dehydraters indicated in Table 12 were subjected to the same flocculation test as in Example 66, using mixed raw sludge (pH 6.5, SS 1.2 wt %, VSS./SS 70.6%) from a sewage disposal plant. The results and the physical properties are shown in Table 14.

Controls 25 and 26

The DAM (N,N-dimethylaminoethyl methacrylate) type polymers indicated in Table 14 were polymerized by the known method and subjected to the same flocculation test as in Example 66. The results and the physical properties are shown in Table 14.

Examples 74 and 75

The organic sludge dehydraters indicated in Table 12 were subjected to the same flocculation test as in Example 66, using mixed raw sludge (pH 6.2, SS 1.5 wt %, VSS/SS 71.5%) from a sewage disposal plant. The resutls and the physical properties are shown in Table 15.

Controls 27 and 28

The DAM (N,N-dimethylaminoethyl methacrylate) type polymers indicated in Table 16 were polymerized by the known method and subjected to the same flocculation test as in Example 66. The results and the physical properties are shown in Table 15.

TABLE 14

| | Organic sludge dehydration agent | Properties of organic sludge dehydration of agent | | | Cohesiveness | |
|---|---|---|---|---|---|---|
| | | Cv(meq/g) | Av(meq/g) | Intrinsic viscosity [η](dl/g) | Amount of filtrated water after 10 sec(ml) | Water content of dehydrated cake(%) |
| Example 72 | Example 62 | 3.1 | 1.2 | 3.8 | 68 | 76.8 |
| Example 73 | Example 63 | 2.9 | 0.6 | 4.0 | 73 | 77.0 |
| Control 25 | DAM type | 2.1 | 0.0 | 5.2 | 70 | 79.8 |
| Control 26 | DAM type | 1.9 | 0.0 | 6.5 | 73 | 80.2 |

DAM type: N,N-dimethylaminoethyl methacrylate type
Intrinsic viscosity is a value in 1N—NaNO$_3$(at 30° C.).

TABLE 15

| | Organic sludge dehydration agent | Properties of organic sludge dehydration of agent | | | Cohesiveness | |
|---|---|---|---|---|---|---|
| | | Cv(meq/g) | Av(meq/g) | Intrinsic viscosity [η](dl/g) | Amount of filtrated water after 10 sec(ml) | Water content of dehydrated cake(%) |
| Example 74 | Example 64 | 2.3 | 0.8 | 4.2 | 75 | 80.8 |
| Example 75 | Example 65 | 1.7 | 0.6 | 4.3 | 78 | 81.2 |
| Control 27 | DAM type | 1.2 | 0.0 | 5.5 | 74 | 83.2 |

TABLE 15-continued

| | Organic sludge dehydration agent | Properties of organic sludge dehydration of agent | | | Cohesiveness | |
|---|---|---|---|---|---|---|
| | | Cv(meq/g) | Av(meq/g) | Intrinsic viscosity [η](dl/g) | Amount of filtrated water after 10 sec(ml) | Water content of dehydrated cake(%) |
| Control 28 | DAM type | 0.9 | 0.0 | 7.5 | 78 | 84.5 |

DAM type: N,N-dimethylaminoethyl methacrylate type
Intrinsic viscosity is a value in 1N—NANO₃(at 30° C.).

What is claimed is:

1. A method for the production of a water-in-oil form amphoteric polyelectrolyte emulsion comprising
    (a) emulsifying either at least one anionic monomer (i) selected from the group consisting of acrylic acid and methacrylic acid or a mixture of said anionic monomer (i) with a nonionic monomer (ii) in water-in-oil form in the presence of water, a surfactant, and a hydrophobic organic solvent to obtain an emulsified monomer or monomer mixture, then
    (b) polymerizing or copolymerizing the emulsified monomer or monomer mixture with a radical polymerization catalyst thereby forming a water-in-oil form vinylic carboxylic acid polymer (iii) in emulsion, then
    (c) allowing the resultant vinylic carboxylic acid polymer (iii) to react with an alkylene imine thereby aminoalkylating said vinylic polymer (iii) in emulsion, and subsequently
    (d) acidifying the aminoalkylated vinylic polymer (iii) emulsion with a monobasic acid to form an amphoteric polyelectrolyte emulsion containing an aminoalkyl group and a carboxyl group.

2. A method according to claim 1, wherein said nonionic monomer (ii) accounts for a proportion in the range of 0 to 70 mol % of the amount of said vinylic carboxylic acid polymer (iii).

3. A method according to claim 1, wherein said nonionic monomer (ii) is at least one member selected from the group consisting of vinyl monomers possessing an amide group and represented by the general formula X:

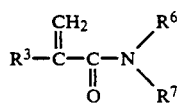
(X)

wherein $R^3$, $R^6$ and $R^7$ are independently a hydrogen atom or an alkyl group, vinyl monomers possessing a hydroxyalkyl group and represented by the general formula XI:

(XI)

wherein $R^3$, $R^8$ and $R^9$ are independently a hydrogen atom or an alkyl group, vinyl monomers possessing a hydroxyalkyl group, (meth)acrylonitrile, and vinyl monomers possessing an ester group and represented by the general formula XII:

(XII)

wherein $R^3$ and $R^{10}$ are independently a hydrogen atom or an alkyl group.

4. A method according to claim 1, wherein said polymerization is carried out at a temperature in the range of 30° C. to 100° C.

5. A method according to claim 1, wherein said alkylene imine is represented by the general formula:

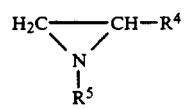

wherein $R^4$ is a hydrogen atom or an alkyl group and $R^5$ is a hydrogen atom, an alkyl group or an alkyl group substituted with an ω-hydroxy group.

6. A method according to claim 1, wherein said water-in-oil form amphoteric copolymer emulsion possesses an intrinsic viscosity [η] in the range of 0.1 to 25.

* * * * *